United States Patent
Luther (10) Patent No.: US 8,925,857 B2
(45) Date of Patent: **\*Jan. 6, 2015**

(54) IN-LINE STAGED HORIZONTAL TAKEOFF VEHICLES AND RELATED METHODS

(71) Applicant: David Luther, Wheatland, WY (US)

(72) Inventor: David Luther, Wheatland, WY (US)

(\*) Notice: Subject to any disclaimer, the term of this patent is extended or adjusted under 35 U.S.C. 154(b) by 17 days.

This patent is subject to a terminal disclaimer.

(21) Appl. No.: 14/101,690

(22) Filed: Dec. 10, 2013

(65) Prior Publication Data

US 2014/0158812 A1    Jun. 12, 2014

Related U.S. Application Data

(60) Provisional application No. 61/735,351, filed on Dec. 10, 2012.

(51) Int. Cl.
*B64C 37/02* (2006.01)
*B64C 39/10* (2006.01)
*B64C 39/02* (2006.01)
*B64D 5/00* (2006.01)

(52) U.S. Cl.
CPC .............. *B64C 39/10* (2013.01); *B64C 39/024* (2013.01); *B64D 5/00* (2013.01); *B64C 2201/082* (2013.01)
USPC .......................... 244/2; 244/158.9; 244/159.3

(58) Field of Classification Search
USPC ............ 244/2, 158.9, 159.3, 171.3, 171.4, 63
See application file for complete search history.

(56) References Cited

U.S. PATENT DOCUMENTS

| | | | | |
|---|---|---|---|---|
| 2,981,499 A | * | 4/1961 | Janney, II | 244/2 |
| 2,992,794 A | * | 7/1961 | Boyd | 244/3.15 |
| 3,000,593 A | * | 9/1961 | Haberkorn et al. | 244/2 |
| 3,289,974 A | * | 12/1966 | Cohen et al. | 244/159.3 |
| 3,568,953 A | * | 3/1971 | Beezley | 244/2 |
| 3,702,688 A | * | 11/1972 | Faget | 244/159.3 |
| 3,999,728 A | * | 12/1976 | Zimmer | 244/140 |
| 4,802,639 A | * | 2/1989 | Hardy et al. | 244/2 |
| 5,526,999 A | * | 6/1996 | Meston | 244/2 |
| 5,564,648 A | * | 10/1996 | Palmer | 244/2 |
| 8,528,853 B2 | * | 9/2013 | Luther | 244/2 |

\* cited by examiner

*Primary Examiner* — Christopher P Ellis (74) *Attorney, Agent, or Firm* — Andrew Rush; PCT Law Group, PLLC (57) ABSTRACT

Aircraft systems that are optimized for multiple phases of flight are disclosed. In an aspect, an in-line staged aircraft is disclosed comprising a launch vehicle and a flight vehicle which are configured to join together along a common center line and form a single air foil in the joined configuration. The flight vehicle and the launch vehicle are separable in flight. In an aspect, the flight vehicle is an unmanned aerial vehicle configured for high-altitude, long-endurance operations.

20 Claims, 12 Drawing Sheets

IN-LINE STAGED HORIZONTAL TAKEOFF VEHICLES AND RELATED METHODS

CROSS-REFERENCE TO RELATED APPLICATIONS AND PATENTS

This application claims the benefit of U.S. Provisional Patent Application No. 61/735,351, filed Dec. 10, 2012, and entitled "In-Line Stages Horizontal Takeoff Vehicle", the entire contents of which is incorporated herein by reference.

The subject matter of this application is related to U.S. Pat. No. 8,528,853 and to U.S. Design Pat. No. D 677,613.

FIELD OF THE DISCLOSURE

The present disclosure generally relates to aerospace vehicles and more particularly to multi-stage atmospheric vehicles, spacecraft, and methods of operating such vehicles.

BACKGROUND

In aerospace generally and aviation in particular, reducing the total fuel and equipment required to achieve a desired velocity, altitude, or operational envelope has long been sought.

Improving Operational Abilities

A variety of approaches have been taken to improve the operational abilities of aerospace vehicles. For example, many modern airplane fuselages are configured as monocoque or semi-monocoque structures wherein the exterior surface of the fuselage is also the primary load bearing member. This increases strength of the airplane while reducing the mass required for maintaining structural integrity. Thus, more mass can be devoted to useful payload (e.g., cargo, personnel, remote sensing equipment, weaponry, navigation equipment, communications equipment, fuel, and the like). Refinement, streamlining, and use of more efficient engines and wing profiles in modern aircraft (e.g., the Boeing 747®, available from The Boeing Company of Seattle, Wash.) has enabled vehicles with a useful payload fraction of 45 to 55%. Payload fraction, the measure of payload and fuel mass compared to total vehicle mass, has nearly doubled since the days of early propeller-driven aircraft.

While modern aircraft are very efficient, their design is optimized for taking off, ascending to a desired altitude, performing the required actions (e.g., crossing an ocean, surveilling an area), descending, and safely landing. Because aircraft are optimized for the entire flight path, they often do not achieve maximum efficiency during every stage of their operation. For example, an aircraft may be extremely efficient when landing, but inefficient when performing aerial surveillance from 50,000 feet.

Multi-stage vehicles partially address optimizing aerospace vehicle for their entire flight path. Multi-stage vehicles have long been used to efficiently transport and deliver payloads. A typical multi-stage vehicle comprises at least two stages, stacked one on top of the other. Each stage contains engines and propellant. The upper stage(s) contain operational payloads such as the crew, remote sensing equipment, weaponry, and the like. At launch, the first stage fires, lifting the vehicle into the air. Once the first stage runs out of propellant, it is jettisoned and the second stage ignites, carrying the payload to the desired location (e.g., a low earth orbit, an apogee, and the like). By jettisoning the lower stage(s) after it ceases operation, the vehicle reduces the remaining mass that must be carried to the desired location. Thus, the vehicle may use less fuel to get to the desired location. This also enables transport of larger payloads in the upper stage. Some multi-stage vehicles, like the Saturn V (operated by the National Aeronautics and Space Administration) or the Titan family of vehicles (operated by the United States Air Force, among others) utilize expendable stages. That is, each stage of the vehicle is designed for a single use. After this use the stage is jettisoned and destroyed or abandoned. While these vehicles may be optimized for each portion of their flight path, discarding stages after a single use is costly and severely curtails operational readiness because an entire new vehicle must be constructed and assembled after each use.

Other multi-stage vehicles, like the Space Shuttle (operated by the National Aeronautics and Space Administration), are partially reusable. That is, one or more stages of such vehicles are recovered and used again. While these vehicles avoid wasting the recovered stages, operational readiness is limited because of the significant processing time in between flights. Atlantis experienced the quickest turnaround of a Shuttle orbiter, as only 54 days lapsed between its launch on STS-51J and its launch on STS-61 B. Shuttle orbiter processing times were significant for many reasons, including the following: the Space Shuttle external tank (ET) was a single-use item, requiring a new ET to be built and tested for each flight; reusable portions of the Space Shuttle had to be recovered from their landing in the ocean; and the Space Shuttle was assembled and launched vertically, limiting the locations from which it could be processed and launched.

Shuttle orbiters, such as Atlantis, are lifting bodies, optimized for reentering the atmosphere and landing horizontally on a runway. The Space Shuttle is not optimized for other portions of the vehicle's flight path, however, because the orbiter does not provide aerodynamic lift during takeoff.

Emergence of Drone Aircraft

Unmanned and armed aircraft are known as "combat drones". Such vehicles operate autonomously or semi-autonomously, flying to or from areas of interest with little or no human direction. Such vehicles may be remotely controlled by a pilot located off board the aircraft for use in combat zones. Combat drones may be controlled from remote locations several thousand miles away from their intended target, with a lag-time, or 'latency,' of only a few seconds. This unmanned style of combat has increased since its introduction in the early 2000s; an estimated 6,300 combat drones are currently used by the United States across the world.

Unmanned and unarmed aircraft are known as "surveillance drones". Such vehicles may be autonomously controlled by onboard computers, may be under the remote control of an off board pilot, or may be controlled by a combination of the two. Surveillance drones may be used for surveillance by law enforcement and other government agencies within its own borders. The surveillance drone can also be used for stealth, data-gathering missions in combat zones. The elimination of a human pilot from the surveillance drone allows the aircraft to "loiter" in an area of interest for a significantly longer time than possible with an on-site human operator because the drone is not constrained by the physiological limits of a human pilot.

Surveillances drones are advancing in onboard technology offered, including onboard cameras with infrared technology, heat sensors and facial recognition capabilities.

Currently, the most advanced drones under development may takeoff using onboard jet engines. Once the drone reaches station altitude, the jet engine is powered-down, and the drone enters electric power mode. In electric power mode, the drone stays aloft via solar rechargeable electric battery-powered motors and propellers, and the engine provides no utility for the drone. In fact, the engine and fuel tanks are a detriment because such components have a significant mass and take up a significant amount of room within the cramped drone. Holding the dormant jet engine aloft places some drain on the drone's electric battery store.

Given the foregoing, what is needed are devices and methods which facilitate optimization of an aerospace vehicle during some or all phases of flight. Devices and methods which enable land-based recovery and reintegration of staged aerospace vehicles and aircraft are also needed. In particular, facilitating such recovery and reintegration without extensive ground support equipment is desired.

Additionally, devices and methods are needed which enable drones to: achieve a station altitude without an onboard jet engine or fuel tanks; reach station altitude with no power drain; and remain on station longer.

SUMMARY

This Summary is provided to broadly introduce concepts that are described in detail below in the Detailed Description section. This Summary is not intended to identify key features or essential features of the disclosures subject matter, nor is this Summary intended as an aid in determining the scope of the disclosed subject matter.

Aspects of the present disclosure meet the above defined needs by providing devices and methods which facilitate aerospace vehicles optimized for one or more phases of the vehicle's flight. In particular, such needs are met via providing and operating a multi-stage aerospace vehicle (e.g., an aircraft, a spacecraft, and the like) configured for horizontal takeoff and landing and wherein more than one stage of the vehicle provides aerodynamic lift during atmospheric flight. An aerospace vehicle's flight may include, but is not limited to the following phases: takeoff, ascent, station altitude operation, descent, and landing.

As described above, multi-stage vehicles offer benefits over single stage vehicles. During a given phase of flight, multi-stage vehicles enable an aerospace vehicle to perform in a manner more closely tailored to the unique demands and opportunities of that flight phase. For example, a multi-stage vehicle such as the Space Shuttle consists of an orbiter portion designed to reduce the fuel needed to safely land. The Shuttle orbiter is configured as a lifting body, thereby enabling the orbiter to glide to a safe landing during the descent and landing phases of its flight.

In an aspect, a multi-stage aircraft is provided which is optimized for multiple phases of the vehicle's flight. The multi-stage aircraft comprises a launch vehicle and a flight vehicle and may takeoff horizontally. The front portion of the launch vehicle is configured to removably connect to the rear portion of the flight vehicle such that the two portions act as a single aircraft when connected. In this manner, the multi-stage aircraft is horizontally staged. The launch vehicle and the flight vehicle may separate during flight.

The launch vehicle comprises one or more engines (e.g., bi-propellant rocket engine, solid rocket motor, turbojet engine, turboprop engine, and the like) configured to provide sufficient power to enable powered flight of the multi-stage aircraft.

The launch vehicle and the flight vehicle each comprise wing portions configured to provide lift during atmospheric flight. The wing portions of the launch vehicle are configured to allow the launch vehicle to fly without being connected to the flight vehicle. Similarly, the wing portions of the launch vehicle are configured to allow the flight vehicle to fly without being connected to the launch vehicle.

When the launch vehicle and the flight vehicle are connected, the wing portions of the launch vehicle and the wing portions of the flight vehicle each provide lift. In an aspect, the wing portions of the launch vehicle and the wing portions of the flight vehicle create a continuous wing when the launch vehicle and the flight vehicle are connected. That is, the wing portions act as a single unit and are spaced sufficiently closely (e.g., touching, separated by inches, separated by a small distance relative to the size of the wings) that laminar flow of air is maintained over the wings. The generation of force from both stages of the multi-stage aircraft optimizes the takeoff and ascent phases of flight as compared to other multi-stage vehicles. For example, the stages of the Titan family of rockets provide no aerodynamic lifting forces during any phase of flight; such rockets may only gain altitude via propulsive forces. While the Space Shuttle orbiter is configured to provide lift, the configuration of the Space Shuttle at launch does not enable the generation of lifting forces during the takeoff and ascent phases of flight. Typical horizontal launch vehicles either mask the wings to reduce drag, losing the lift of that craft, or stack two aircraft, producing greater frontal area and drag.

Upon reaching a desired altitude or position, the launch vehicle and the flight vehicle may separate. The wing portion of the flight vehicle provides lift for the now separated flight vehicle, enabling it to stay aloft. The flight vehicle comprises one or more engines configured to facilitate powered flight of the flight vehicle. The flight vehicle wing portions are configured to provide sufficient lift at a desired station altitude that one or more small engines may be used to maintain the flight vehicle's altitude. In an aspect, the flight vehicle wings provide sufficient lift and the flight vehicle engines provide sufficient power to maintain its altitude however the vehicle lacks sufficient power to takeoff without the assistance of the launch vehicle. In this manner, the flight vehicle is optimized for the station altitude operation, descent, and landing portions of the flight. Energy consumption of the flight vehicle is reduced for extended duration.

After separation, the launch vehicle may descend and land horizontally on a runway. Similarly, after performing desired tasks, the flight vehicle may descend and land horizontally on a runway. Because both the launch vehicle and the flight vehicle comprise engines, they may fly to and land at any airstrip. After landing, the launch vehicle and any other compatible flight vehicle may be easily reconnected and re-equipped for another flight, enabling reusability while reducing processing time. In an aspect, the flight vehicle is equipped with engines which are sufficiently powerful to keep the flight vehicle aloft, but lack the power to allow the vehicle to take off under its own power (i.e., without being attached to the launch vehicle).

In some aspects of the present disclosure, the flight vehicle is an unmanned drone. The flight vehicle may be configured as a high-altitude, long-endurance (HALE) drone. In other aspects of the present disclosure, the launch vehicle is an unmanned drone.

Where the flight vehicle is a drone, the mid-flight removal of the powerful engines necessary for the flight vehicle to ascend to an operational altitude and travel to an operational area enables a higher fraction of the drone's payload to be devoted to useful equipment (e.g., cargo, personnel, remote sensing equipment, weaponry, navigation equipment, communications equipment, fuel, and the like).

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to systems and methods which facilitate aerospace vehicles optimized for one or more phases of the vehicle's flight. In particular, multi-stage aircraft are disclosed and methods of operating such aircraft are disclosed wherein the aircraft is configured for horizontal takeoff and landing and wherein more than one stage of the aircraft provides aerodynamic lift during atmospheric flight. In aspects of the present disclosure, the wings of each stage are positioned sufficiently closely (e.g., touching, separated by inches, separated by a small distance relative to the size of the wings) when the stages of the vehicle are connected such that they operate as a single wing. That is, in some aspects, the wings form a single wing and airflow remains laminar over the entirety of the joined wing. An aircraft's flight may include, but is not limited to the following phases: takeoff, ascent, station altitude operation, descent, and landing.

In an aspect, such multi-stage aircraft enables the positioning of a high-altitude, long-endurance drone at a desired altitude and location while reducing the energy required to bring the drone to the desired location and increasing the payload space available for operations equipment (e.g., cargo, remote sensing equipment, weaponry, navigation equipment, communications equipment, fuel, and the like).

For the purposes of this disclosure, the term "aircraft" is a single or multi-stage vehicle capable of powered or unpowered flight. The term includes, but is not limited to, aerospace vehicles, airplanes, gliders, sailplanes, spacecraft, lifting bodies, or other vehicle capable of flight. As will be appreciated by those skilled in the relevant art(s) after reading the description herein, one or more stages of the multi-stage aircraft disclosed may be configured for operation in space (e.g., suborbital operation, orbital operation, and the like).

Reference may be made to the front, back, left, right, top, and bottom portions of the aircraft. For the purposes of the present disclosure, the front portion of an item described (e.g., a flight vehicle, a launch vehicle, and the like) is that portion of the item which leads during flight. The top portion of an item described is that portion of the item which appears higher than other portions when the aircraft is taxing. The left side of an item described is that portion of the item which appears on the left when the aircraft is viewed from above and its nose is pointing forward. It is understood that such terms are used to clarify the present disclosure. The present disclosure should not be limited by such usage.

As will be readily apparent to those skilled in the relevant art, aspects of the present disclosure may possess right halves and left halves that are substantially identical. That is, the aircraft may be symmetrical in that the right half of the aircraft is a mirror image of the left half thereof. Accordingly, reference may be variously made to only the right side or the left side of the aircraft. It will be understood that the other side of the device, while not specifically described, is constructed and functions in a similar manner to the portions described.

Figure 1:
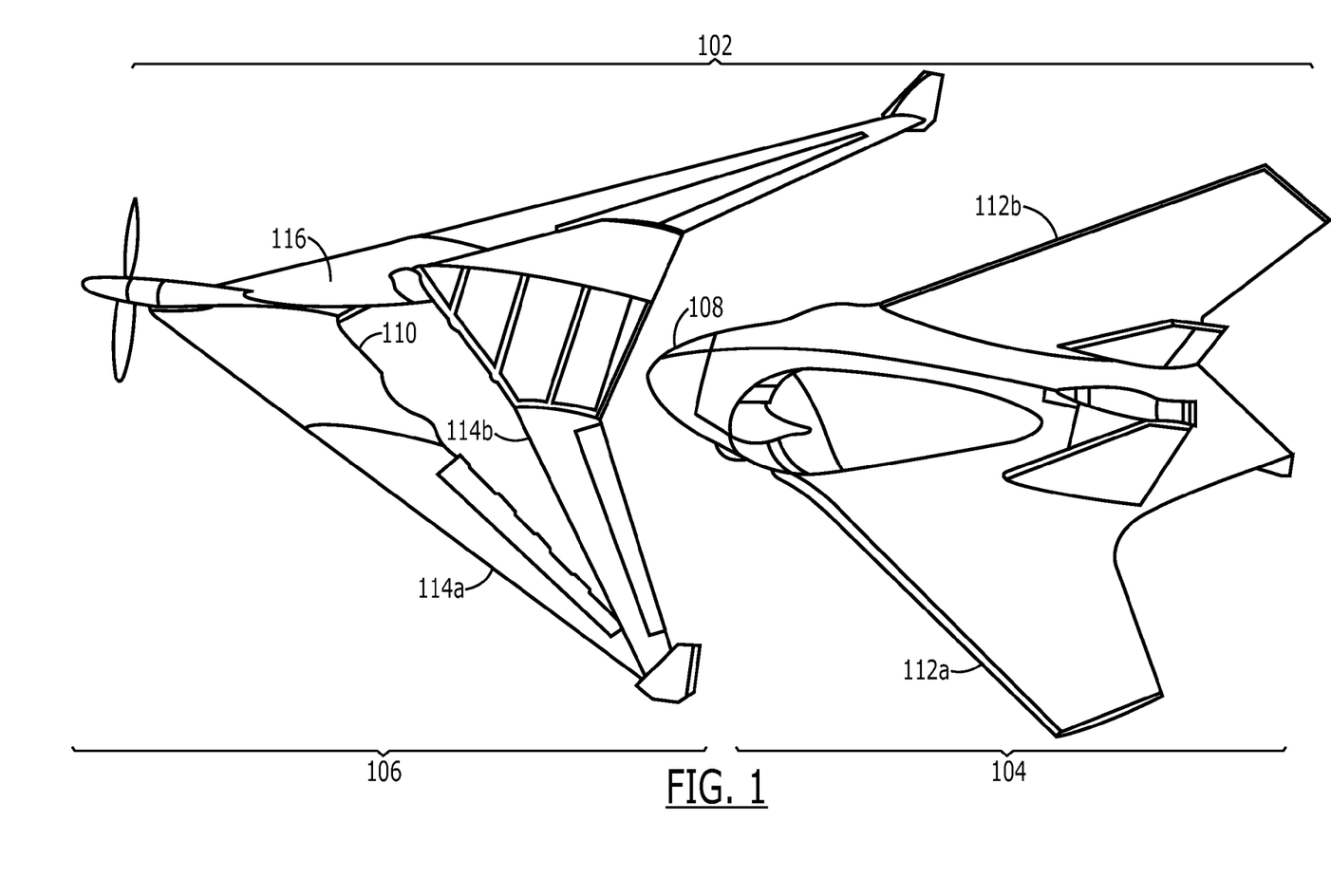
FIG. 1 is a perspective view of a multi-stage aircraft in a separated configuration, according to an aspect of the present disclosure.

Referring now to FIG. 1, a perspective view of a multi-stage aircraft 102 in a separated configuration, according to an aspect of the present disclosure, is shown.

In an aspect, aircraft 102 is optimized for multiple phases of the flight. Aircraft 102 comprises a launch vehicle 104 and a flight vehicle 106 and may takeoff horizontally. The launch vehicle front portion 108 is configured to removably connect to the flight vehicle rear portion 110 such that the two portions act as a single aircraft when connected. In this manner, aircraft 102 is horizontally staged.

Figure 2:
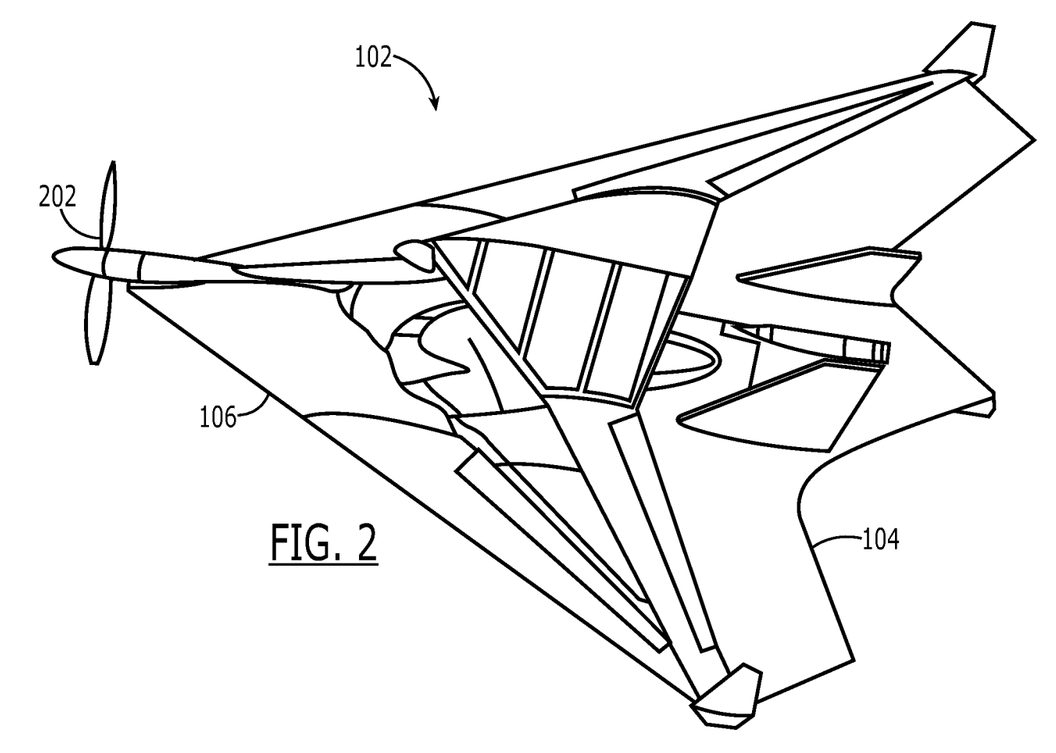
FIG. 2 is a perspective view of a multi-stage aircraft in a joined configuration, according to an aspect of the present disclosure.

Launch vehicle 104 and flight vehicle 106 may separate during flight. Launch vehicle 104 and flight vehicle 106 are removably connected in a manner that facilitates in-flight transition from a joined configuration (as shown in FIG. 2) to a separated configuration (as shown in FIG. 1). Flight vehicle rear portion 110 is configured to approximately conform to launch vehicle front portion 108. Thus, when aircraft 102 is in a joined configuration, flight vehicle 106 and launch vehicle 104 form a single airfoil. In an aspect, a single airfoil is formed by the positioning of launch vehicle wing portions adjacent to flight vehicle wing portions. Positioning is sufficiently close (e.g., contacting, spaced a short distance) that the wing portions act as a single airfoil. Flight vehicle rear portion 110 and launch vehicle front portion 108 may comprise connectors (not shown in FIG. 1) which removably engage when aircraft 102 is in a joined configuration. In an aspect, such connectors are explosive bolts. In another aspect, the trailing edge of flight vehicle 106 wing portions may interconnect with launch vehicle front portion.

In another aspect, such connectors are reusable and may be reengaged in-flight or in between flights. Connectors may be hydraulic clamps, grapplers, and the like.

Launch vehicle 104 and flight vehicle 106 each comprise wing portions configured to provide lift during atmospheric flight. The wing portions of launch vehicle 104 are configured to allow launch vehicle 104 to fly without being connected to flight vehicle 106. Similarly, the wing portions of flight vehicle 106 are configured to allow flight vehicle 106 to fly without being connected to launch vehicle 104.

In an aspect, launch vehicle 104 is configured as a blended body vehicle and comprises launch vehicle wings 112 (labeled, for clarity, as launch vehicle wings 112a and 112b in FIG. 1). Launch vehicle wings 112 may have a moderate or low aspect ratio. Where launch vehicle wings 112 have such aspect ratios, aircraft 102 may still comprise a combined airfoil with a high aspect ratio (as shown in FIG. 1) while enabling flight vehicle wings 114 (labeled, for clarity, as flight vehicle wings 114a and 114b in FIG. 1) to have high aspect ratio wings optimized for high-altitude, long-endurance flight.

Where flight vehicle 106 is a high-altitude, long-endurance drone, it may be configured for optimal operation during the station altitude phase of flight. Flight vehicle may be configured as a flying wing. In such an aspect, flight vehicle wing 114 encompasses a substantial portion of flight vehicle structure.

Flight vehicle wings 114 may be configured for optimal operation during the station altitude operation phase of flight. At high altitudes, long, slender wings are often preferable because of their high aerodynamic efficiency, large wing area, and low drag. However, such wings tend to be very flexible and fragile. Flight vehicle 106 may maintain the large wing area of a vehicle with long slender wings via incorporation of two airfoils. Flight vehicle 104 may comprise two flight vehicle wings 114. In an aspect, flight vehicle wings 114 are configured as swept back airfoils. In another aspect, such as the aspect depicted in FIG. 4, flight vehicle wings 114 are configured as flying wings.

Figure 4:
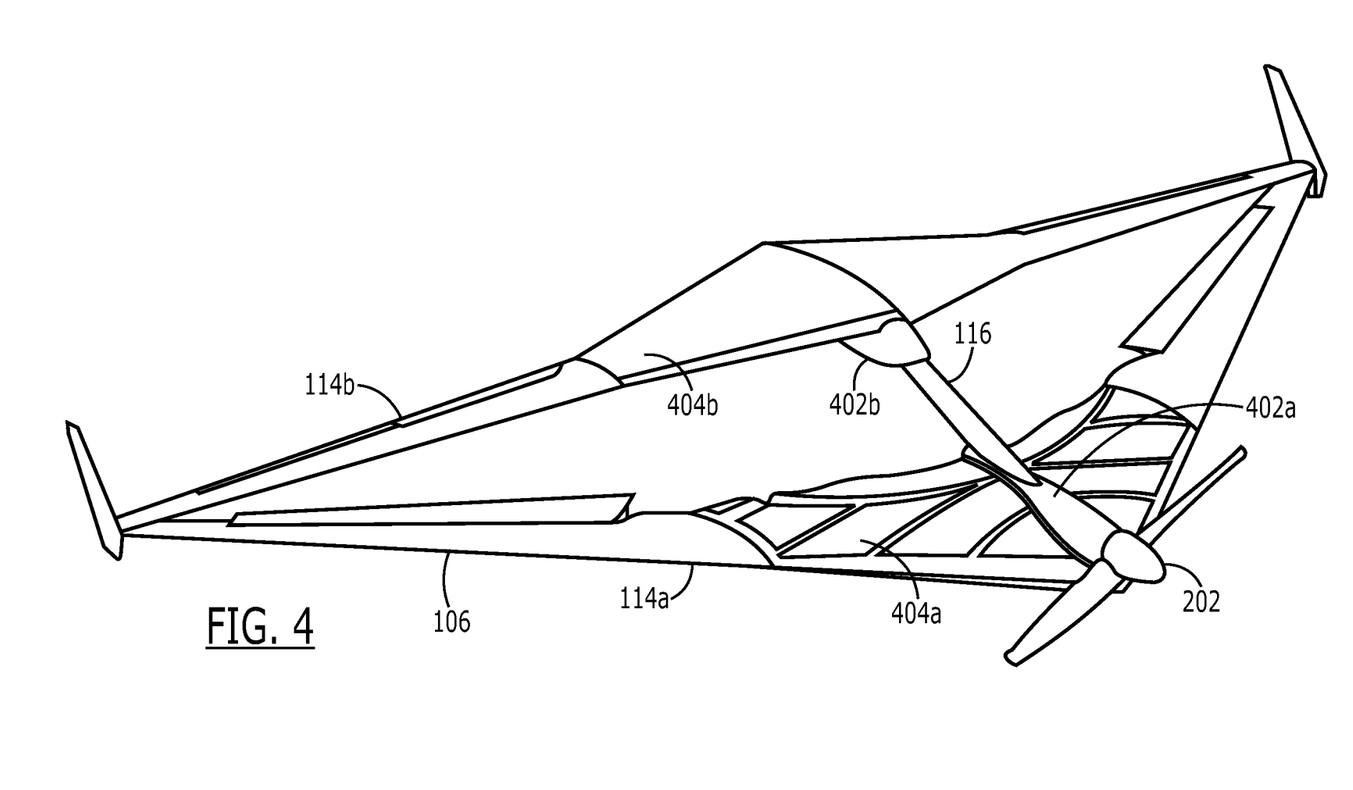
FIG. 4 is a perspective view of a flight vehicle, according to an aspect of the present disclosure.

Flight vehicle wings 114 may have a thickness which enables payloads to be housed within the wing. Such a design is akin to flying wing aircraft.

In order to increase rigidity, lower flight vehicle wing 114a and upper flight vehicle wing 114b may be joined at the tip portions of such flight vehicle wings 114. Structural advantage is provided by the "truss" structure form where the upper and lower wings join as a triangle or joined wing configuration. Flight vehicle 106 may further comprise a strut 116. Strut 116 is configured to increase structural integrity of flight vehicle. Strut may interconnect lower flight vehicle wing 114a and upper flight vehicle wing 114b. A first portion of strut 116 is connected to the top of lower flight vehicle wing 114a. A second portion of strut 116 is connected to the bottom of upper flight vehicle wing 114b.

Flight vehicle wings 114 may be arranged in a backwards stagger configuration. In another aspect, flight vehicle wings 114 may be arranged in a forward stagger configuration or upper flight vehicle wing 114b may be positioned directly above lower flight vehicle wing 114a.

In other aspects, flight vehicle wings 114 and launch vehicle wings 112 may have different aspect ratios (e.g., low, moderate, and high), wing sweeps (e.g., swing-wing, forward swept, swept, straight, and the like), or multiple wings (e.g., biplane). As will be appreciated by those skilled in the relevant art after reading the description herein, flight vehicle wing 114 and launch vehicle wing 112 configurations may be chosen to enable desired operational capabilities and may be optimized for both joined configuration functionality and separated configuration functionality.

As will be appreciated by those skilled in the relevant art after reading the description herein, flight vehicle 106 and launch vehicle 104 may further comprise control surfaces (not labeled, for clarity, in FIG. 1) adapted for, for example, atmospheric flight.

Referring now to FIG. 2, a perspective view of multi-stage aircraft 102 in a joined configuration, according to an aspect of the present disclosure, is shown.

Aircraft 102 may be configured to takeoff and fly to a desired station location and altitude in the join configuration shown in FIG. 2 before entering the separated configuration shown in FIG. 1. Flight vehicle 106 may comprise one or more engines 202. Engine 202 may be propeller-driven engine, such as a turboprop engine or electrically driven propeller. Propeller-driven engines may be configured for quiet operation, enabling deployment of unmanned, drone flight vehicles 106 into hostile areas of interest. In other aspects, engine 202 may be a rocket engine, turbojet engine, turboprop engine, or the like.

Engine 202 may remain inactive until flight vehicle 106 detaches from launch vehicle 104. In another aspect, engine 202 activates prior to separation and may provide additional power for flight and separation of flight vehicle 106 and launch vehicle 104.

When the launch vehicle 104 and the flight vehicle 106 are connected, the wing portions of launch vehicle 104 and the wing portions of flight vehicle 106 each provide lift. The generation of force from both stages of aircraft 102 optimizes the takeoff and ascent phases of flight as compared to other multi-stage vehicles. For example, the stages of the Titan family of rockets provide no aerodynamic lifting forces during any phase of flight; such rockets may only gain altitude via propulsive forces. While the Space Shuttle orbiter is configured to provide lift during the landing phase, it does not generate lifting forces during the takeoff and ascent phases of flight.

Upon reaching a desired altitude or position, launch vehicle 104 and flight vehicle 106 may separate. The wing portion of flight vehicle 106 provides lift for the now separated flight vehicle 106, enabling it to stay aloft. Flight vehicle 106 may comprise one or more engines configured to facilitate powered flight. Flight vehicle wing portions are configured to provide sufficient lift at a desired station altitude that one or more small engines may be used to maintain flight vehicle's altitude. In an aspect, the flight vehicle wings provide sufficient lift and the flight vehicle engines provide sufficient power to maintain its altitude however the vehicle lacks sufficient power to takeoff without the assistance of launch vehicle 104. In this manner, flight vehicle 106 is optimized for the station altitude operation, descent, and landing portions of the flight.

After separation, launch vehicle 104 may descend and land horizontally on a runway. Similarly, after performing desired tasks, flight vehicle 106 may descend and land horizontally on a runway. Because both launch vehicle 104 and flight vehicle 106 comprise engines, they may fly to and land at any airstrip. After landing, launch vehicle 104 and flight vehicle 106, or any other compatible vehicle, may be easily reconnected and re-equipped for another flight, enabling reusability while reducing processing time.

Figure 3:
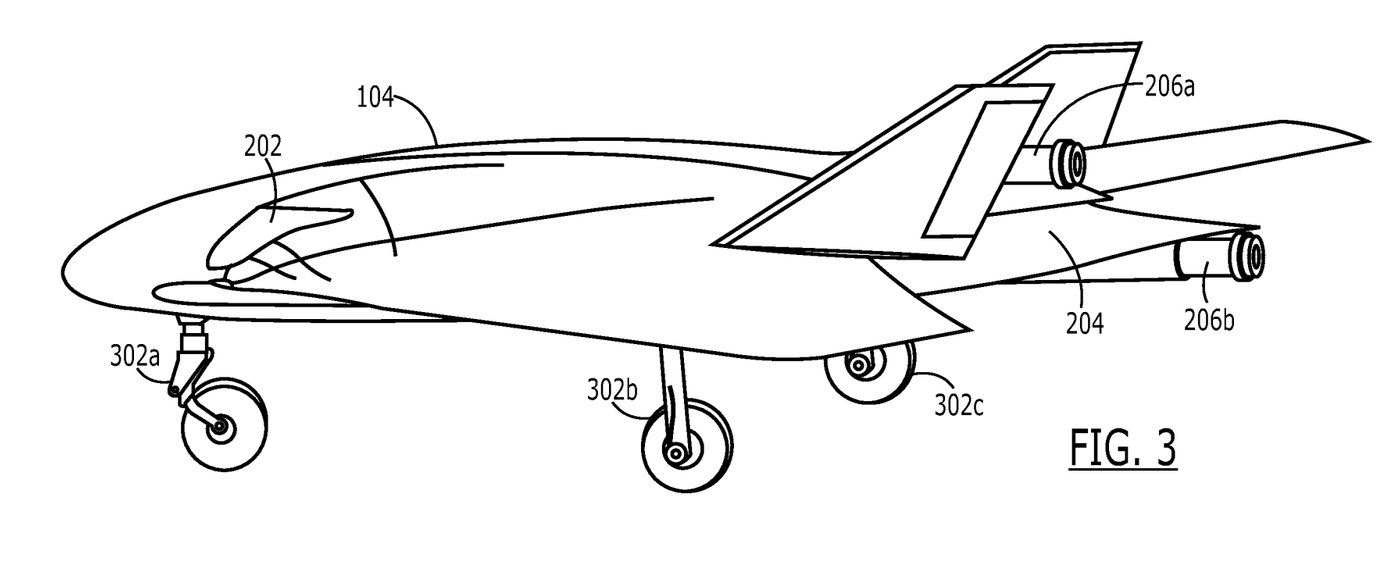
FIG. 3 is a side view of a launch vehicle with the launch vehicle landing gear deployed, according to an aspect of the present disclosure.

Referring now to FIG. 3, a side view of launch vehicle 104 with launch vehicle landing gear 302 deployed, according to an aspect of the present disclosure, is shown.

Launch vehicle 104 comprises one or more main engines (e.g., rocket engine, turbojet engine, turboprop engine, and the like) configured to provide sufficient power to enable powered flight of aircraft 102 (not shown in FIG. 3).

The main engine may be an air-breathing system, such as a turbojet engine. In such aspects, an intake 202 is provided on launch vehicle 104 front. Intake 202 is configured to channel atmosphere into the main engine. Main engine exhaust exits launch vehicle 104 via one or more exhaust ports 204. Exhaust port 204 may be configured to reduce its radar and thermal signature. In another aspect, exhaust port 204 may be gimbaled, to assist launch vehicle maneuverability. In yet another aspect, exhaust port 204 has a variable geometry, configured to optimize the efficiency of the main engine at various thrust levels.

In the joined configuration, aircraft 102 may weigh more than the combined airframe can lift utilizing launch vehicle 104 main engines. In order to facilitate takeoff of aircraft 102 in a joined configuration, launch vehicle 104 may further comprise assist motors 206 (labeled, for clarity, as assist motors 206a and 206b in FIG. 3). Assist motors 206 operate in a fashion similar to Rocket-Assisted Take Off systems, also known as JATO, RATO, and RATOG systems. Typically, cargo planes, such as the C-130 (available from Lockheed Martin of Bethesda, Md.) or drones such as the BQM-74 (available from Northrop Grumman of West Falls Church, Va.) are launched by operating such vehicle's main engines at full thrust and firing attached rocket motors during takeoff, in order to provide additional thrust. In an aspect of the present disclosure, assist motors 206 are solid rocket motors. During takeoff, the main engines are operated at full thrust and assist motors 206 are fired in order to provide additional takeoff thrust. Assist motors 206 may be modular, enabling rapid replacement of spent assist motors 206.

Launch vehicle 104 may comprise deployable landing gear (labeled, for clarity, as landing gear 302a-302c in FIG. 3). Launch vehicle landing gear 302 may be configured to support aircraft 102 in a joined configuration during takeoff. In some embodiments, launch vehicle landing gear 302 may be configured to support aircraft 102 in a joined configuration during landing. Such a configuration may be desirable where flight vehicle 106 does not comprise landing gear and aircraft 102 mission must be aborted. Such landing gear enables recovery of landing gear-less flight vehicles.

Referring now to FIG. 4, a perspective view of flight vehicle 106, according to an aspect of the present disclosure, is shown.

Aircraft 102 may be designed to deliver a portion of the device, namely flight vehicle 106, to an operational area so that flight vehicle 106 may carry out a mission (e.g., surveillance, transportation, and the like). One or more portions of flight vehicle 106 may be configured to carry a payload. Flight vehicle wings 114 may comprise payload areas suitable for fuel, observation equipment, and the like. Flight vehicle wings may comprise central portions 404 (labeled, for clarity, as central portions 404a and 404b in FIG. 4). Central portion 404 may be significantly thicker than other portions of flight vehicle wing 114, creating a volume suitable for accommodating payloads.

Flight vehicle 106 may comprise payload pods 402 (labeled, for clarity, as payload pods 402a, b in FIG. 4). Payload pod 402 may house removable, deployable, or other payloads. In an aspect, payload pod 402 houses engine 202. In another aspect, one or more payload pods 402 may comprise a door, enabling payloads to be exposed to the surrounding environment or released after the door is opened.

Figure 5:
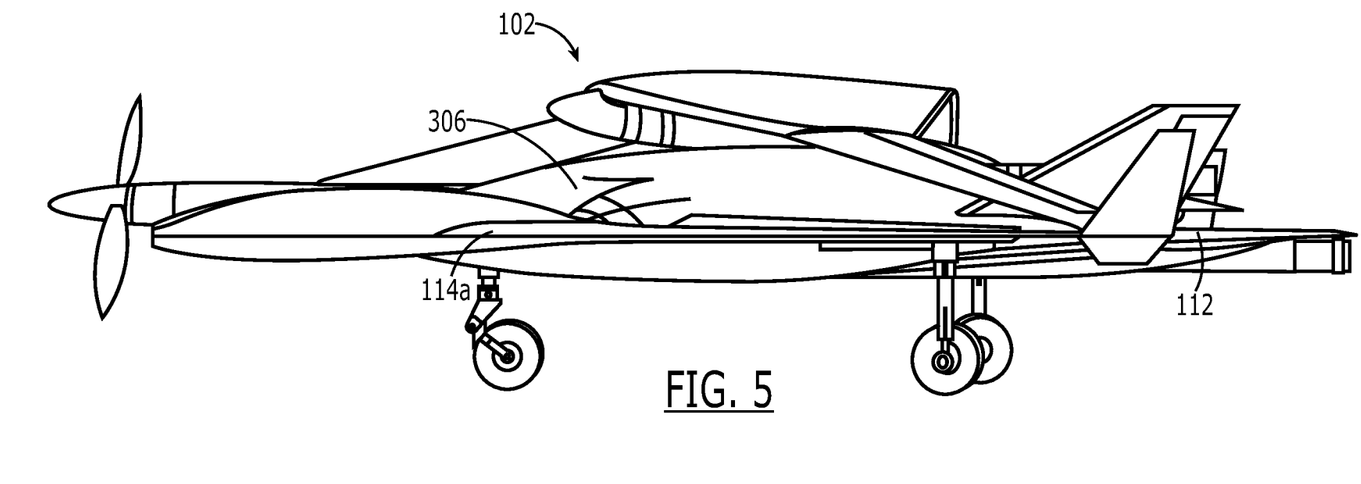
FIG. 5 is a side view of a multi-stage aircraft in a joined configuration with the launch vehicle landing gear deployed, according to an aspect of the present disclosure.

Referring briefly now to FIG. 5, a side view of aircraft 102 in a joined configuration with landing gear 302 deployed, according to an aspect of the present disclosure, is shown.

In a joined configuration, the centerline of lower flight vehicle wing 114a and launch vehicle wings 112 overlap, creating a single airfoil. In this configuration, intake 202 is exposed to the atmosphere and may feed air to launch vehicle 104 main engines. The joined wing drone stage of FIGS. 4 and 5 offer a high altitude long endurance drone that also features a truss type structure for light weight and durability during launch operations. The truss type triangulated wings offer strength for the thin airfoil of a sail plane in a short wingspan. A folding propeller system may further reduce drag during launching operations.

Figure 6:
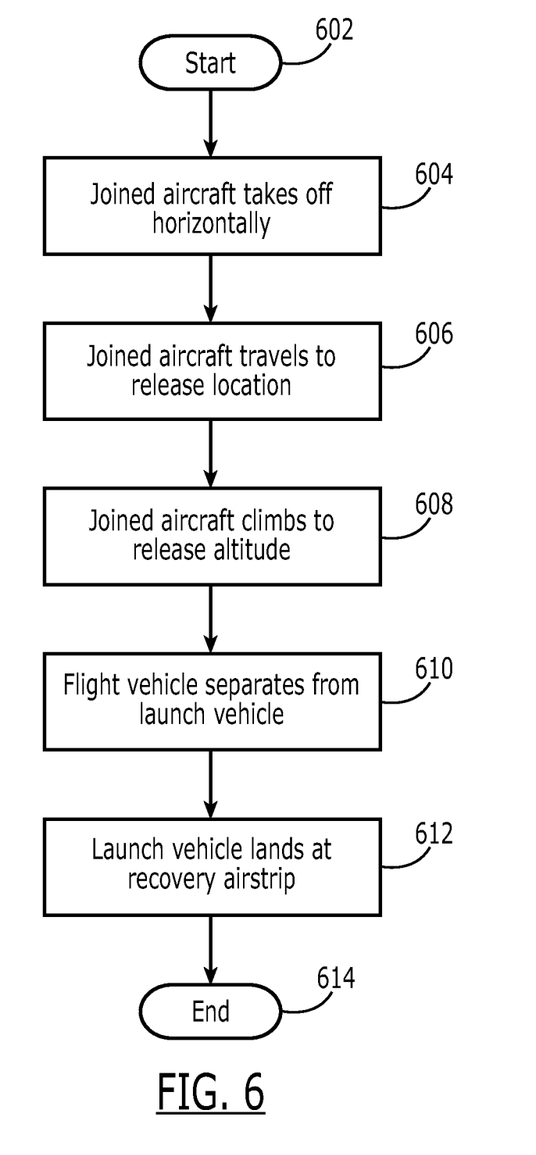
FIG. 6 is a flowchart of a method of deploying a flight vehicle and recovering a launch vehicle, according to an aspect of the present disclosure.

Referring now to FIG. 6, a flowchart of a flight vehicle deploying process 600, according to an aspect of the present disclosure, is shown.

Aircraft 102 may be utilized in a variety of ways and to achieve a variety of operational objectives. Aircraft may be used to deliver flight vehicle 106, configured as an unmanned drone to a specified station altitude and area such that flight vehicle may carry out reconnaissance in an operational area.

Process 600, which utilizes aircraft 102, a launching airstrip, launch rail or catapult and a recovery airstrip, begins at step 602 and immediately proceeds to step 604. Process 600 encompasses a delivery flight path of launch vehicle 104. Process 600 is suitable for delivering flight vehicle 106 to a release location and a release altitude where it may begin high-altitude, long-endurance flight operations. Such flight vehicle 106 may be optimized for high-altitude, long-endurance flight operations and unable to efficiently reach the release location and release altitude from takeoff without the aid of launch vehicle 104. In another aspect, flight vehicle 106 is unable to takeoff in the separated configuration.

In step 604, aircraft 102 is launched from the launching airstrip or rail launcher. Aircraft 102 is configured to takeoff horizontally, therefore aircraft 102 may be launched from a runway or launcher designed for vehicles if the size and flight characteristics of aircraft 102. For example, where aircraft 102 weighs the same as a Cessna® 150 (available from Cessna Aircraft Company of Wichita, Kans.) and requires a similar amount of runway distance to takeoff, aircraft 102 may be launched from civilian or government runways designed for Cessna 150 airplanes. Aircraft 102 takeoff may be assisted by assist motors 206. In another aspect, takeoff is powered solely by launch vehicle 104 main engines. In another aspect, engine 202 and launch vehicle 104 main engines are engaged in order to facilitate takeoff.

In step 606, aircraft 102 is airborne and in the joined configuration. Aircraft 102 travels to a desired release location. The release location is an area where flight vehicle 106 will separate from launch vehicle 104. The transit of step 606 may occur under the sole power of launch vehicle 104 main engines.

In step 608, Aircraft 102 has arrived at the release location and then travels to the release altitude. Release altitude is an altitude where flight vehicle 106 may operate.

In step 610, aircraft 102 transitions from the joined configuration to a separated configuration. After aircraft has arrived at the release location and altitude, connectors on flight vehicle 106 and launch vehicle 104 are actuated and flight vehicle 106 and launch vehicle 104 separate. Separation may be accomplished in a variety of ways. In an aspect, engine 202 remains inactive until connectors actuate. Then, engine 202 is activated and flight vehicle 106 maneuvers away from launch vehicle 104 under power. In another aspect, engine 202 activates prior to separation and may provide additional power for flight and separation of flight vehicle 106 and launch vehicle 104. The wing portion of the flight vehicle 106 provides lift for the now separated flight vehicle 106, enabling it to stay aloft.

After separation, flight vehicle 106 may maneuver away and carry out its designed mission in an area of interest. In some aspects, after completing its mission, flight vehicle 106 flies back to a recovery airstrip. In other aspects, flight vehicle 106 is expendable and therefore does not return to a recovery airstrip.

In step 612, launch vehicle 104 is recovered. After separation, launch vehicle 104 may leave the release area, travel to a recovery airstrip, and land horizontally. Launch vehicle 104 may land at a runway or capture device configured to support aircraft of similar weight and landing requirements (e.g., runway length).

In aspects where both launch vehicle 104 and flight vehicle 106 comprise engines, they may fly to and land at the same recovery airstrip. After landing, launch vehicle 104 and flight vehicle 106 or other compatible flight vehicle may be easily reconnected and re-equipped for another flight, enabling reusability while reducing processing time.

Process 600 ends at step 614.

Figure 7:
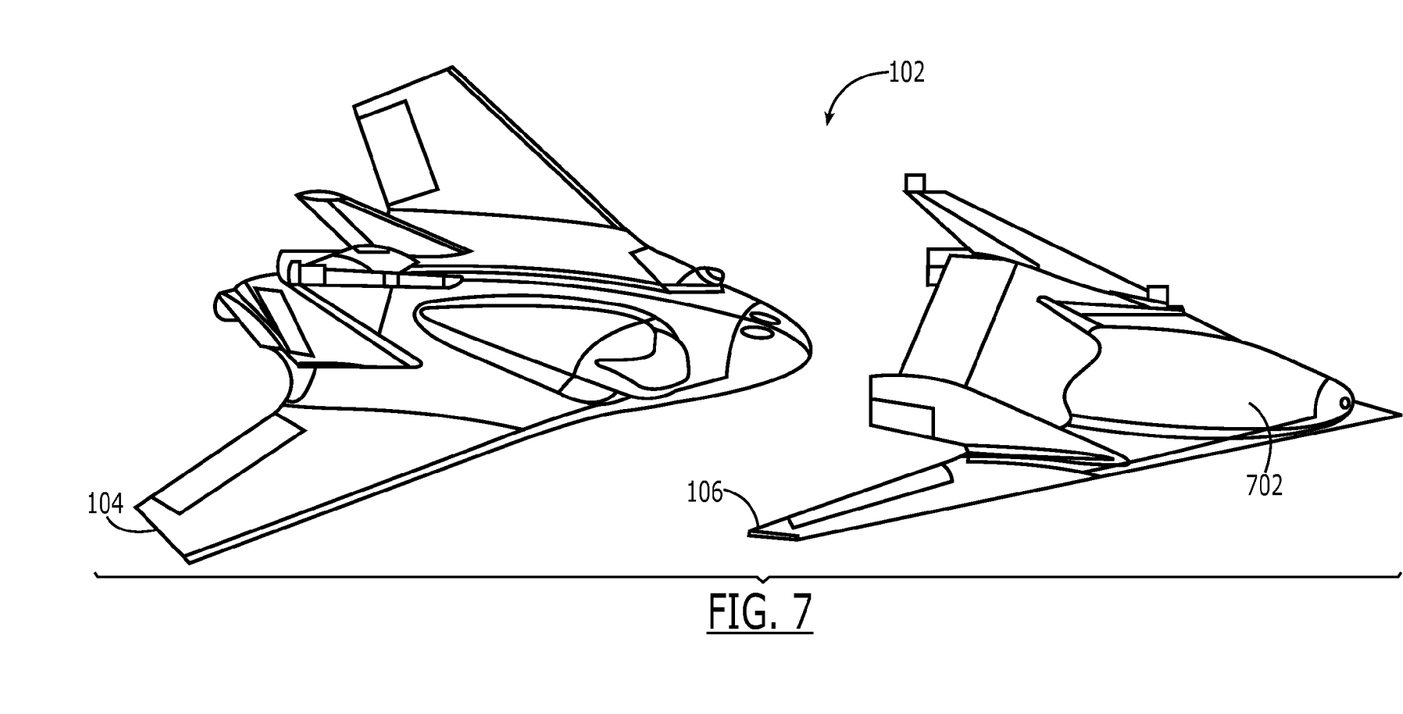
FIG. 7 is a perspective view of a multi-stage aircraft, in a separated configuration, according to an aspect of the present disclosure.
Figure 8:
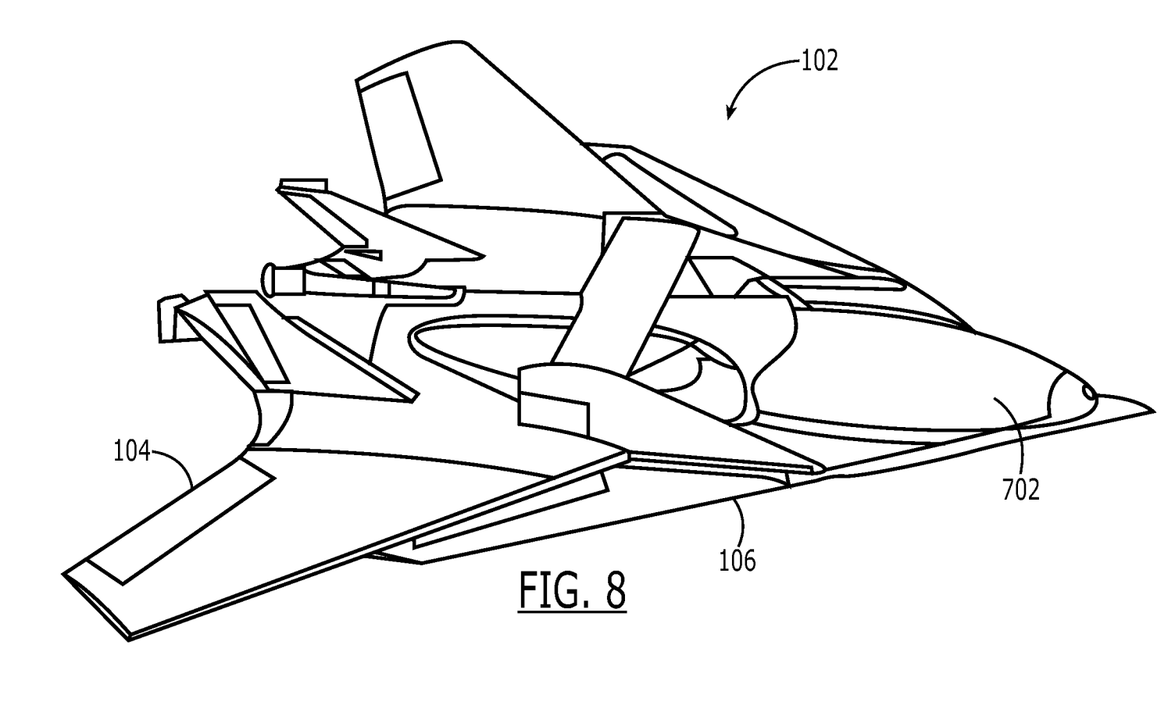
FIG. 8 is a perspective view of a multi-stage aircraft, in a joined configuration, according to an aspect of the present disclosure.
Figure 9:
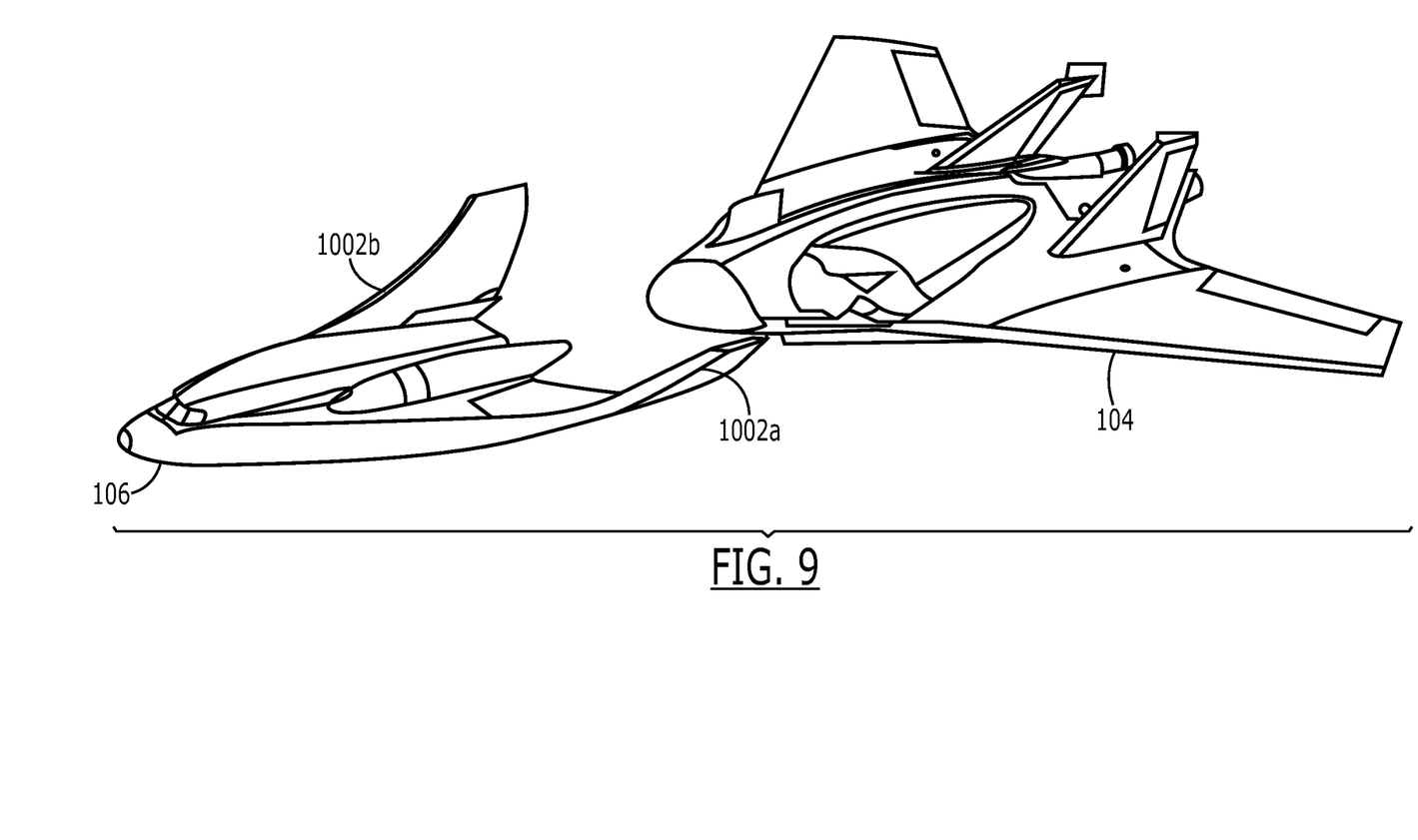
FIG. 9 is a perspective view of a multi-stage aircraft, in a separated configuration, wherein the multi-stage aircraft is configured to deploy the flight vehicle to space, according to an aspect of the present disclosure.
Figure 10:
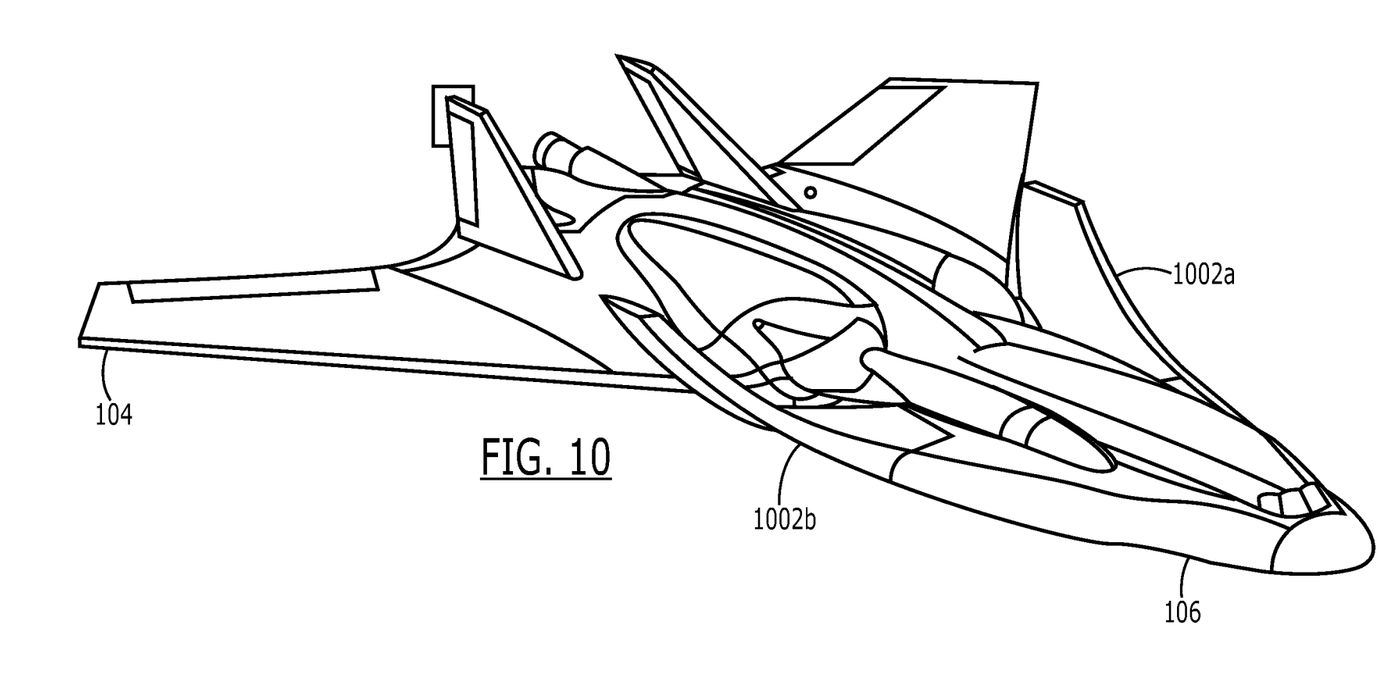
FIG. 10 is a perspective view of a multi-stage aircraft, in a joined configuration, wherein the multi-stage aircraft is configured to deploy the flight vehicle to space, according to an aspect of the present disclosure.

Referring now to FIGS. 7 and 8, perspective view of another configuration of aircraft 102, in separated and joined configurations, respectively, according to aspects of the present disclosure, are shown. Variants may be short endurance or weapon capable.

Multiple aspects of flight vehicle 106 may be utilized with a single launch vehicle 104 aspect. Launch vehicle 104 may be utilized with flight vehicles of FIGS. 1-5 as well as flight vehicles of FIGS. 7-12. Flight vehicle 106 may be configured such that flight vehicle body 702 may carry larger payloads. In another aspect, flight vehicle 102 may be configured for orbital or suborbital trajectories. FIGS. 7 and 8 reflect a configuration for an extremely small unmanned supersonic combat aircraft. They are area ruled to operate at supersonic speeds when joined, and the weapon stage contributes wing area which reduces the size of the carrier aircraft. The weapon stage could be configured to engage ground or air targets. By offering the smallest possible combat craft, cost and radar signature are reduced to enable swarm attacks against radar defenses.

Referring now to FIGS. 9-12, perspective views of aircraft 102, wherein aircraft 102 is configured to deploy flight vehicle 106 to space, according to aspects of the present disclosure, are shown.

Flight vehicle 106 may be configured for operation in space. Flight vehicle 106 may be launched from launch vehicle 104 which may be configured to interface with other flight vehicles 104, such as a high-altitude, long-endurance drone or missiles.

Figure 11:
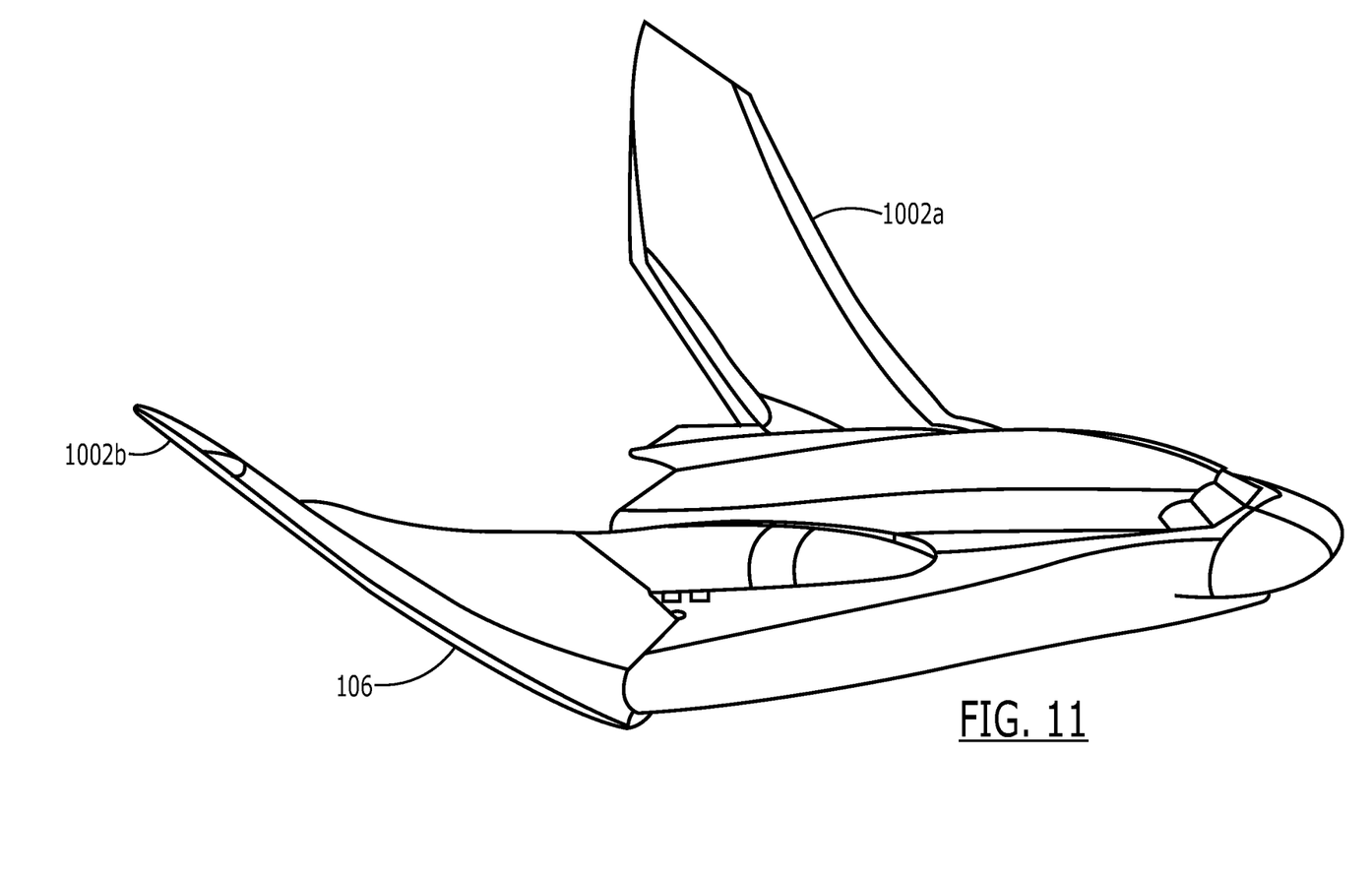
FIG. 11 is side view of the flight vehicle wherein the flight vehicle wings are angled upward, according to an aspect of the present disclosure.
Figure 12:
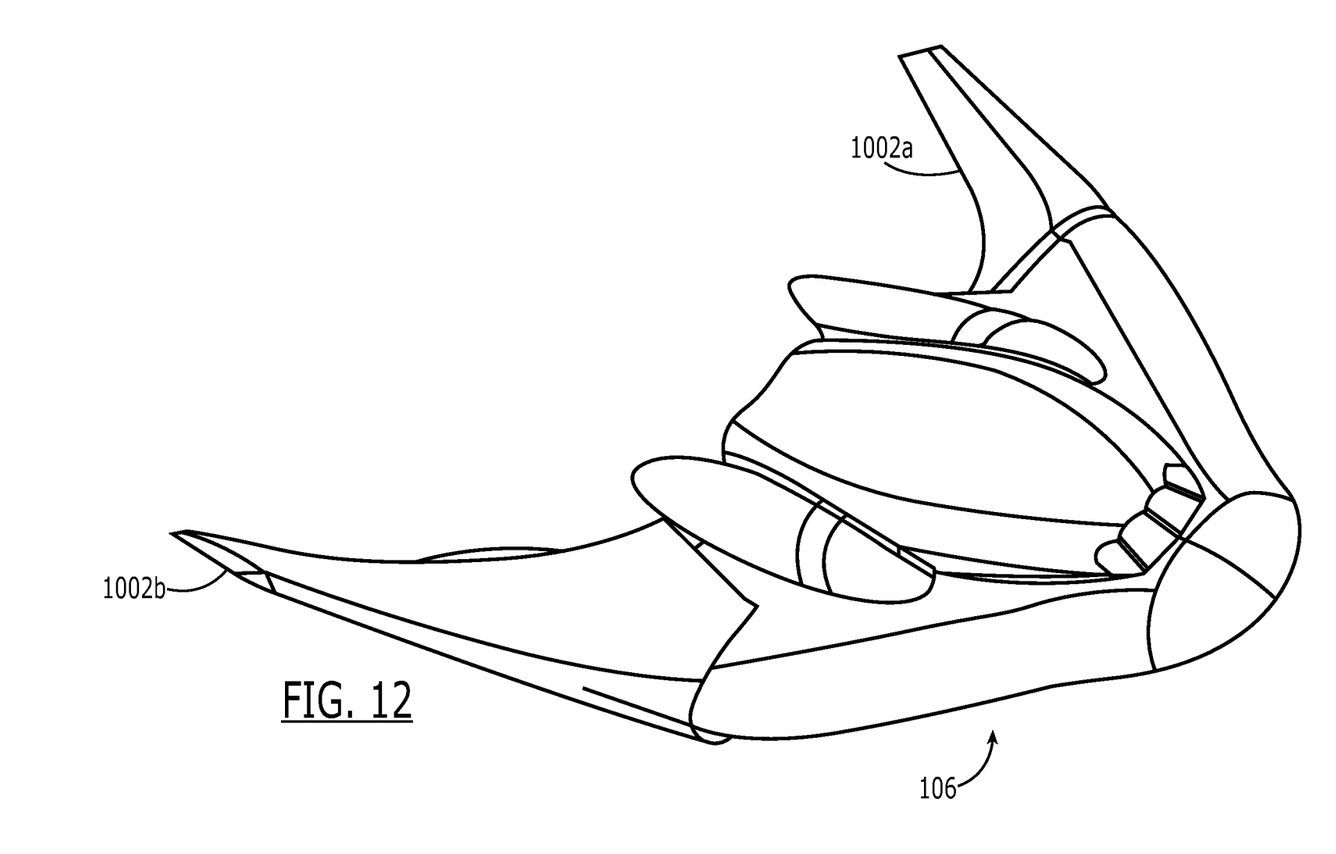
FIG. 12 is a side view of the flight vehicle wherein the flight vehicle wings are angles to facilitate altering the trajectory of the flight vehicle, according to an aspect of the present disclosure.

Flight vehicle 106 may comprise enlarged elevons or rotatable wings 1002 (labeled, for clarity as rotatable wings 1002*a* and 1002*b* if FIGS. 9-12). Rotatable wings 1002 allow the body geometry of flight vehicle 106 to be altered during operation, thereby facilitating maneuvers, aerobraking and the like. As shown in FIG. 11, rotatable wings 1002 may be positioned in an aero-braking orientation, increasing drag on flight vehicle 106, thereby reducing velocity on reentry. Elevons may be hinged at an angle to impart yaw during roll for turns.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An in-line staged aircraft optimized for multiple phases of flight, comprising:
    (a) a launch vehicle, comprising:
        (i) a launch vehicle front portion; and
        (ii) at least one launch vehicle wing; and
    (a) a flight vehicle, comprising:
        (i) a flight vehicle rear portion configured to conform to the launch vehicle front portion; and
        (ii) at least one flight vehicle wing;
    wherein the launch vehicle and the flight vehicle are configured to join along a common center line and move between a joined configuration and a separated configuration;
    wherein the in-line staged aircraft is configured to takeoff horizontally in the joined configuration; and
    wherein in the joined configuration, the at least one launch vehicle wing is positioned adjacent to the at least one flight vehicle wing, the at least one launch vehicle wing and the at least one flight vehicle wing operating as a single airfoil.

2. The in-line staged aircraft of claim 1, wherein the launch vehicle and the flight vehicle are configured to re-engagably move between the joined configuration and the separated configuration.

3. The in-line staged aircraft of claim 1, wherein the in-line staged aircraft is an unmanned aerial vehicle.

4. The in-line staged aircraft of claim 1, wherein the launch vehicle further comprises landing gear, configured to support the in-line staged aircraft in the joined configuration during takeoff.

5. A launch vehicle, comprising:
    (a) a launch vehicle front portion configured to removably join to a flight vehicle at a flight vehicle rear portion, forming an in-line staged aircraft;
    (b) at least one launch vehicle wing positioned, when the launch vehicle is removably joined to the flight vehicle adjacent to at least one flight vehicle wing, the at least one launch vehicle wing and the at least one flight vehicle wing operating as a single airfoil;
    (c) at least one launch vehicle engine; and
    (d) a landing gear configured to support the in-line staged aircraft in the joined configuration during takeoff;
    wherein the launch vehicle is configured to take off and land horizontally; and wherein the launch vehicle is configured to join to the flight vehicle along a common center line and move from a joined configuration and a separated configuration while in flight.

6. The launch vehicle of claim 5, wherein the launch vehicle is an unmanned aerial vehicle configured for atmospheric flight.

7. The launch vehicle of claim 5, wherein the launch vehicle is optimized for a delivery flight path comprising: taking off in the joined configuration; ascending to a release location, the release location having a release altitude; separating from the flight vehicle; and landing.

8. The launch vehicle of claim 7, wherein the launch vehicle is configured to autonomously carry out the delivery flight path.

9. The launch vehicle of claim 5, further comprising:
at least one air breathing engine configured to enable powered flight of the in-line staged aircraft in the joined configuration.

10. A flight vehicle, comprising:
(a) a flight vehicle rear portion configured to removably join to a launch vehicle at a launch vehicle front portion, forming an in-line staged aircraft; and
(b) a first flight vehicle wing positioned, when the flight vehicle is removably joined to the launch vehicle, adjacent to at least one launch vehicle wing, the at least one launch vehicle wing and the first flight vehicle wing operating as a single airfoil;
wherein the flight vehicle is configured to join to the launch vehicle along a common center line and move from a joined configuration and a separated configuration while in flight.

11. The flight vehicle of claim 10, wherein the flight vehicle is an unmanned aerial vehicle.

12. The flight vehicle of claim 10, wherein the first flight vehicle wing is configured as a flying wing having first flight vehicle wing tip portions, the flight vehicle further comprising:
(c) a second flight vehicle wing configured as a flying wing having second flight vehicle wing tip portions; and
(d) a strut interconnecting the first flight vehicle wing and the second flight vehicle wing;
wherein the first flight vehicle wing and the second flight vehicle wing are joined together at the first flight vehicle wing tip portions and the second flight vehicle wing tip portions.

13. The flight vehicle of claim 12, wherein the second flight vehicle wing is offset from the first flight vehicle wing and positioned above the first flight vehicle wing.

14. The flight vehicle of claim 10, wherein the flight vehicle is optimized for powered, high altitude, long endurance flight.

15. The flight vehicle of claim 10, further comprising an engine.

16. The flight vehicle of claim 15, wherein the engine is a propeller-driven engine.

17. The flight vehicle of claim 10, further comprising the system preventing the flight vehicle from taking off in the separated configuration.

18. The flight vehicle of claim 10, wherein the at least one flight vehicle wing is configured to be rotatable, operable as an aerobrake.

19. An aircraft having a launch vehicle and a flight vehicle comprising:
the flight vehicle having an airfoil wing and a rearward portion adapted to receive a forward portion of the launch vehicle in an in-line joined configuration for horizontal takeoffs;
the launch vehicle having an airfoil wing that, when the vehicles are fitted together in the in-line joined configuration, the airfoil wings of both the launch vehicle and the flight vehicle function together as a single airfoil; and
a mechanism for releasing the vehicles from the joined configuration after a horizontal takeoff and then later permitting rejoinder and reuse of the vehicles after both have landed.

20. A method for operating a flight vehicle and a launch vehicle together, the method comprising the steps of:
fitting the flight vehicle with an airfoil wing and a rearward portion and receiving a forward portion of the launch vehicle in an in-line joined configuration for horizontal takeoffs;
fitting the launch vehicle with an airfoil wing that, when the vehicles are fitted together in the in-line joined configuration, the airfoil wings of both the launch vehicle and the flight vehicle function together as a single airfoil; and
releasing the vehicles from the joined configuration after a horizontal takeoff and then later permitting rejoinder and reuse of the vehicles after both have landed.

* * * * *